US009421932B2

(12) United States Patent
Renforth et al.

(10) Patent No.: US 9,421,932 B2
(45) Date of Patent: Aug. 23, 2016

(54) PARTITION APPARATUS FOR USE IN A VEHICLE

(71) Applicant: DOSKOCIL MANUFACTURING COMPANY, INC., Arlington, TX (US)

(72) Inventors: Jack William Renforth, Azle, TX (US); Ann Hanson, Ionia, MI (US); Paul Fair, Denver, CO (US); Jamie Kummerfeld, Greeley, CO (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 27 days.

(21) Appl. No.: 14/181,913

(22) Filed: Feb. 17, 2014

(65) Prior Publication Data

US 2014/0252791 A1 Sep. 11, 2014

Related U.S. Application Data

(60) Provisional application No. 61/765,365, filed on Feb. 15, 2013.

(51) Int. Cl.
*B60R 21/02* (2006.01)
*B60R 21/12* (2006.01)
*A01K 1/02* (2006.01)
*B60P 3/04* (2006.01)

(52) U.S. Cl.
CPC ............. *B60R 21/026* (2013.01); *A01K 1/0272* (2013.01); *B60R 21/02* (2013.01); *B60R 21/12* (2013.01); *B60P 3/04* (2013.01)

(58) Field of Classification Search
CPC ...... B60R 21/02; B60R 21/06; B60R 21/026; B60R 21/12; B60R 2021/065; B60R 2021/0266
See application file for complete search history.

(56) References Cited

U.S. PATENT DOCUMENTS

| | | | | | |
|---|---|---|---|---|---|
| 2,997,331 | A | * | 8/1961 | Kudner | 296/24.46 |
| 3,049,373 | A | * | 8/1962 | Biggers | 296/106 |
| 3,169,781 | A | * | 2/1965 | Abruzzino | 280/749 |
| 3,190,686 | A | * | 6/1965 | Smiler | 296/24.46 |
| 3,190,687 | A | * | 6/1965 | Johnson | 296/24.46 |
| 3,525,535 | A | * | 8/1970 | Yasusaburo | 280/749 |
| 3,534,998 | A | * | 10/1970 | Johnson | 296/24.46 |
| 4,924,814 | A | * | 5/1990 | Beaudet | 119/712 |
| 4,960,293 | A | * | 10/1990 | Bottinick et al. | 280/749 |
| 5,078,309 | A | * | 1/1992 | Hull et al. | 224/482 |
| D326,076 | S | * | 5/1992 | Wiese | D30/199 |

(Continued)

OTHER PUBLICATIONS

Formosa Pet Barrier [online]. Formosa Covers [Retrieved May 4, 2015]. Retrieved from Internet<URL:http://www.formosacovers.com/petbarrier.html>.*

(Continued)

*Primary Examiner* — Barry Gooden, Jr.
(74) *Attorney, Agent, or Firm* — Global IP Counselors, LLP

(57) ABSTRACT

An improved flexible or semi-rigid vehicle partition apparatus can be used to isolate an animal from certain regions of a vehicle. A plurality of embodiments are disclosed. The improved partition apparatuses can be installed directly behind the front seat or seats of a vehicle and/or, depending upon the configuration of the vehicle, can be installed behind the rear seat or seats of the vehicle. The partition apparatuses are generally lightweight, flexible, manufactured from inexpensive components, and are relatively easy to be installed into a vehicle interior and to removed therefrom.

19 Claims, 11 Drawing Sheets

(56) References Cited

U.S. PATENT DOCUMENTS

| | | | | |
|---|---|---|---|---|
| 5,437,474 | A * | 8/1995 | Ament | 280/749 |
| 5,593,200 | A * | 1/1997 | Schlaffke et al. | 296/37.16 |
| 5,695,217 | A * | 12/1997 | Ament et al. | 280/749 |
| 5,713,624 | A * | 2/1998 | Tower | 296/152 |
| D393,622 | S * | 4/1998 | Goertzen | D12/426 |
| 6,059,313 | A * | 5/2000 | Coogan et al. | 280/749 |
| 6,192,628 | B1 * | 2/2001 | Pinheiro et al. | 49/70 |
| 6,612,606 | B1 * | 9/2003 | Bergenheim et al. | 280/728.1 |
| 6,742,837 | B1 * | 6/2004 | Alexander | 297/188.21 |
| 6,799,534 | B1 * | 10/2004 | Wang | 119/412 |
| 8,220,416 | B1 * | 7/2012 | Stahl | 119/496 |
| D722,549 | S * | 2/2015 | Renforth et al. | D12/400 |
| D722,550 | S * | 2/2015 | Renforth et al. | D12/400 |
| D722,942 | S * | 2/2015 | Renforth et al. | D12/400 |
| D722,943 | S * | 2/2015 | Renforth et al. | D12/400 |
| 2001/0033084 | A1 * | 10/2001 | Murray et al. | 296/24.1 |
| 2002/0096900 | A1 * | 7/2002 | Moore | 296/24.1 |
| 2003/0057722 | A1 * | 3/2003 | Dolman | 296/24.1 |
| 2003/0090119 | A1 * | 5/2003 | Bateman | 296/24.1 |
| 2005/0082859 | A1 * | 4/2005 | Walter et al. | 296/24.4 |
| 2005/0248174 | A1 * | 11/2005 | Cucknell et al. | 296/37.16 |
| 2006/0103155 | A1 * | 5/2006 | Spater et al. | 296/24.46 |
| 2006/0108815 | A1 * | 5/2006 | Giumelli | 296/24.4 |
| 2006/0214447 | A1 * | 9/2006 | Katada | 296/24.43 |
| 2007/0057499 | A1 * | 3/2007 | Fengel et al. | 280/749 |
| 2007/0210597 | A1 * | 9/2007 | Wang | 296/24.43 |
| 2008/0005967 | A1 * | 1/2008 | Johnson et al. | 49/61 |
| 2008/0136205 | A1 * | 6/2008 | Hoffman et al. | 296/24.46 |
| 2009/0045652 | A1 * | 2/2009 | Mossberg et al. | 296/193.08 |
| 2009/0256377 | A1 * | 10/2009 | Beechie et al. | 296/24.46 |
| 2010/0032977 | A1 * | 2/2010 | Parle et al. | 296/24.4 |
| 2010/0158631 | A1 * | 6/2010 | Ackerman et al. | 410/118 |
| 2010/0243979 | A1 * | 9/2010 | Moore | 256/19 |
| 2011/0023788 | A1 * | 2/2011 | Beechie | 119/172 |
| 2012/0181808 | A1 * | 7/2012 | Reed et al. | 296/24.31 |
| 2014/0034692 | A1 * | 2/2014 | Huelke et al. | 224/313 |
| 2014/0103085 | A1 * | 4/2014 | Patronik | 224/318 |
| 2014/0174675 | A1 * | 6/2014 | Updyke | 160/108 |
| 2014/0232131 | A1 * | 8/2014 | Link et al. | 296/24.31 |

OTHER PUBLICATIONS

Pet Ego Mesh Barrier [online]. Wayback—Internet Archive [Retrieved Aug. 29, 2012]. Retrieved from Internet<URL:http://web.archive.org/web/20120829070543/http://www.pettravelcentercom/products/detail/704/24>.*

Pet Precision Barrier with door [online]. Wayback—Internet Archive [Retrieved Oct. 7, 2010]. Retrieved from Internet:<URL:http://web.archive.org/web/20101007114739/http://precisionpet.com/detail.aspx?id=98>.*

Paws and Claws Pet Barrier [online]. Amazon [Retrieved May 4, 2015]. Retrieved from Internet<URL:http://www.amazon.com/Paws-Claws-Barrier-Restraint-Backseat/dp/B0076BE458>.*

* cited by examiner

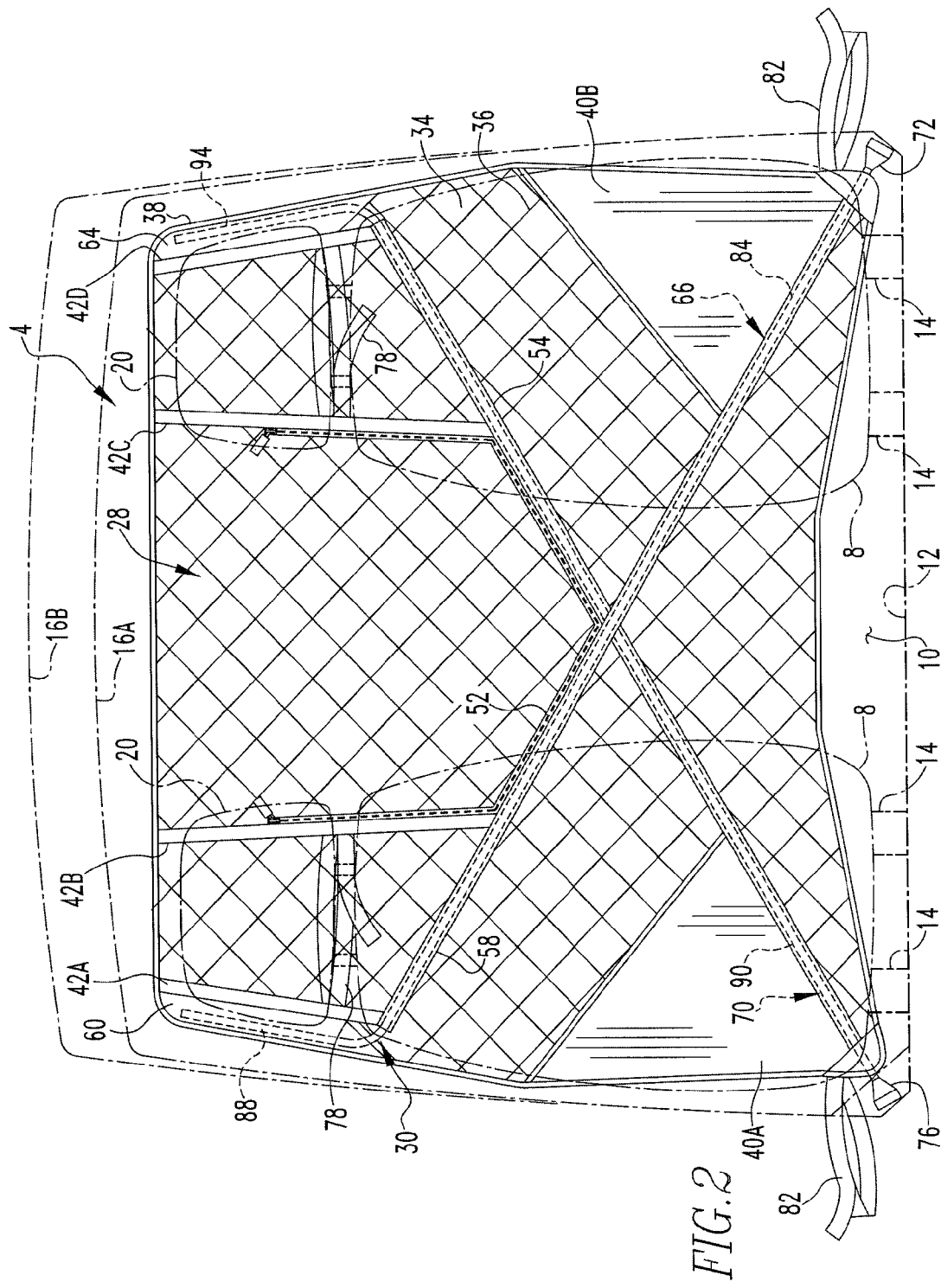

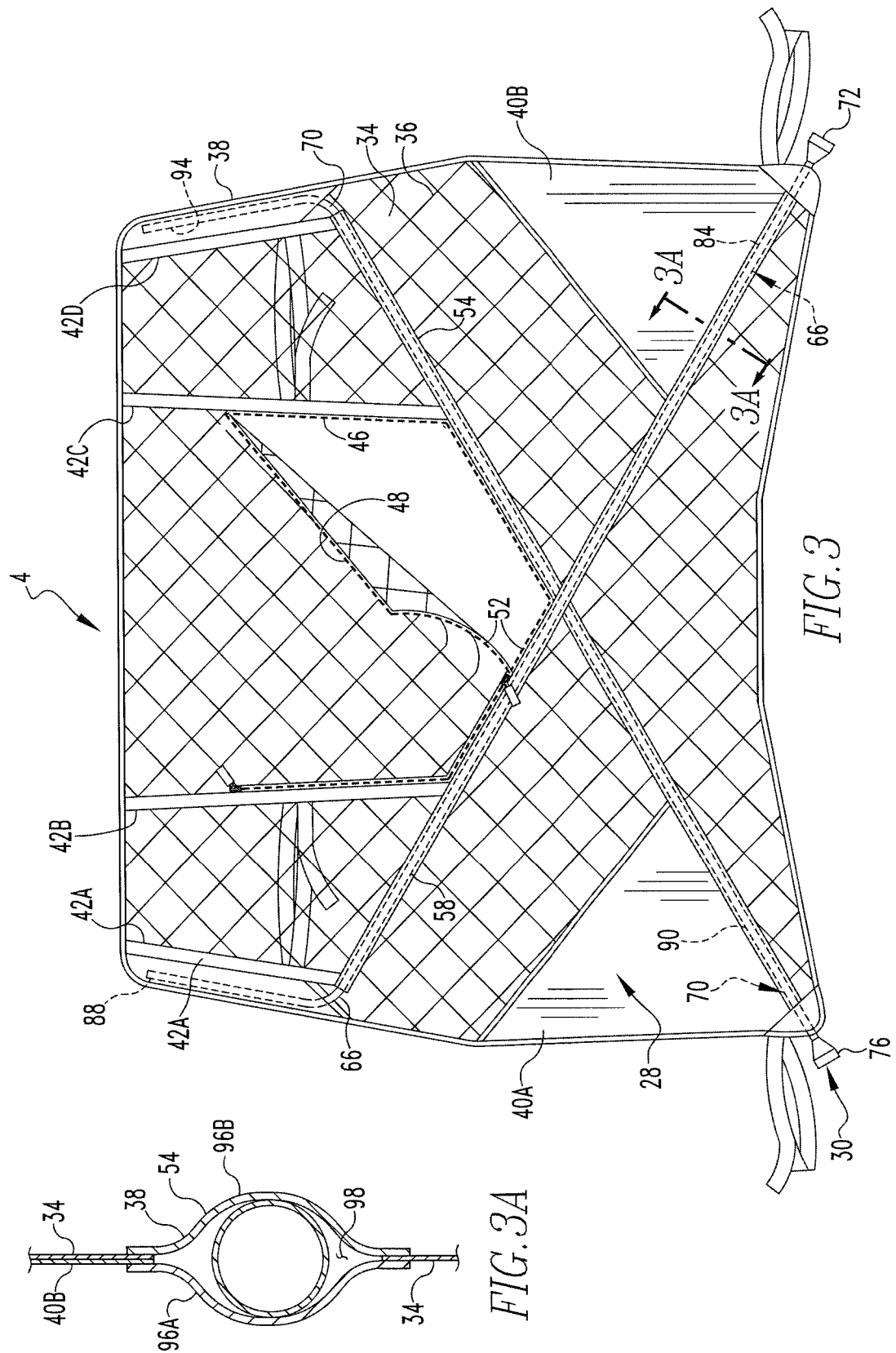

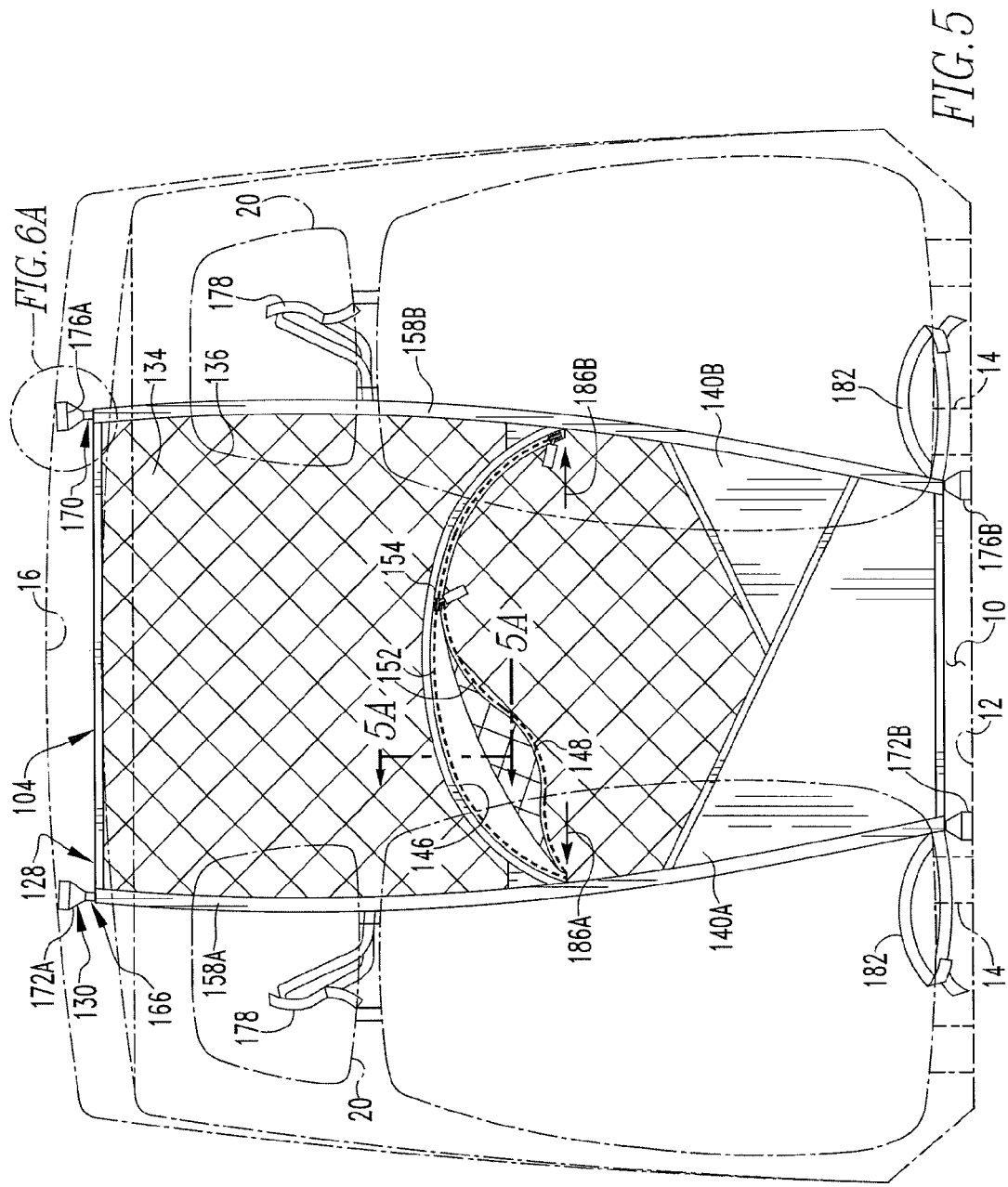
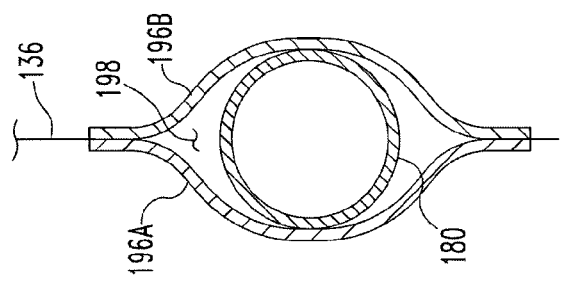

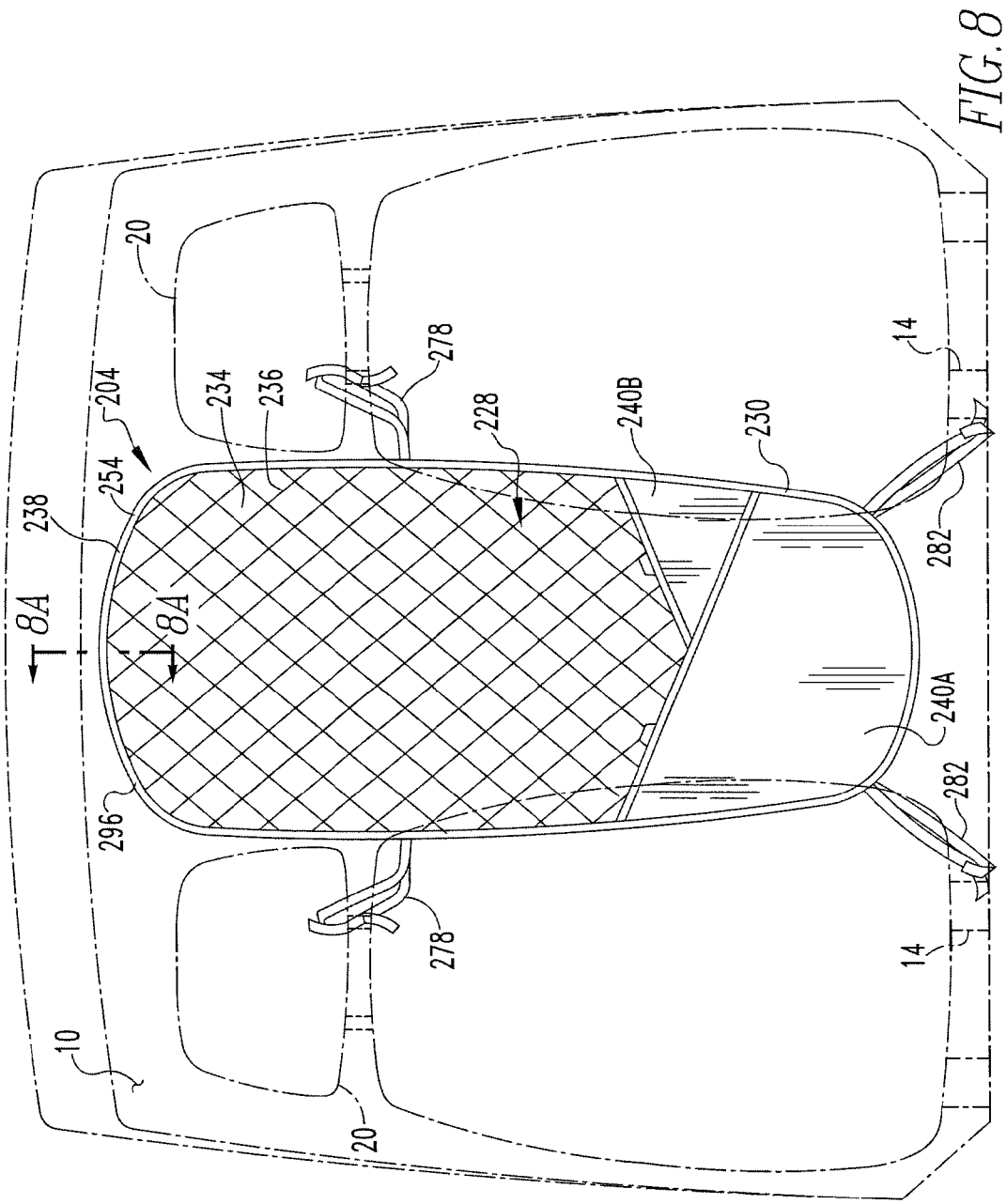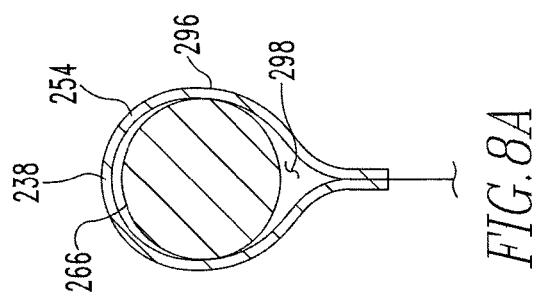
FIG. 8
FIG. 8A

PARTITION APPARATUS FOR USE IN A VEHICLE

CROSS-REFERENCE TO RELATED APPLICATION

The instant application claims priority from U.S. Provisional Patent Application Ser. No. 61/765,365 filed Feb. 15, 2013, the disclosures of which are incorporated herein by reference.

BACKGROUND

1. Field

The disclosed and claimed concept relates generally to a partition apparatus for use within the interior of a vehicle and is usable to constrain an animal to a given region of the interior.

2. Related Art

Animals including pets such as dogs and the like are regularly carried in vehicles. In order to avoid the animal having free access to all regions of the vehicle, it has been known to provide barriers that are situated between, for instance, a region of the vehicle in which the animal is permitted to roam and another region of the vehicle from which the animal is intended to be absent. Previously known barriers of this type have typically been configured of rigid materials that are costly, heavy, and difficult to install. It thus would be desirable to provide a device that addresses these shortcomings and other shortcomings.

SUMMARY

The disclosed and claimed concept relates to flexible or semi-rigid vehicle partition apparatuses that can be used to isolate an animal from certain regions of a vehicle. The improved partition apparatuses can be installed directly behind the front seat or seats of a vehicle and/or, depending upon the configuration of the vehicle, can be installed behind the rear seat or seats of the vehicle. The partition apparatuses are generally lightweight, flexible, manufactured from inexpensive components, and are relatively easy to be installed into a vehicle interior and to removed therefrom.

Accordingly, an aspect of the disclosed and claimed concept is to provide an improved partition apparatus that is usable in conjunction with a vehicle and that is configured to constrain an animal to a predetermined region within the interior of the vehicle and to resist the animal from moving into other regions of the vehicle interior.

Another aspect of the disclosed and claimed concept is to provide such an improved partition apparatus that is one or more of relatively flexible, relatively lightweight, relatively inexpensive, and relatively easy to install and/or remove.

Accordingly, an aspect of the disclosed and claimed concept is to provide an improved partition apparatus that is structured to divide an interior of a vehicle into a first region and a second region and to resist an animal from moving from one of the first region and the second region to the other of the first region and the second region. The partition apparatus can be generally stated as including a barrier formed of a layer of flexible material, a support apparatus formed at least in part of a material having a stiffness greater than that of the barrier, the barrier being disposed on the support apparatus, the support apparatus being structured to retain at least a portion of the barrier in an expanded and generally plane-like configuration, and the support apparatus including at least a first buttress structured to engage a floor of the vehicle.

Another aspect of the disclosed and claimed concept is to provide an improved partition apparatus structured to divide an interior of a vehicle into a first region and a second region and to resist an animal from moving from one of the first region and the second region to the other of the first region and the second region. The partition apparatus can be generally stated as including a barrier formed of a layer of flexible material, a support apparatus comprising an elongated support element that is formed at least in part of a material having a stiffness greater than that of the barrier, the barrier being disposed on the support apparatus, the support element extending about the perimeter of the barrier and being structured to retain at least a portion of the barrier in an expanded and generally plane-like configuration, and the support apparatus further including at least a first connection strap that is structured to be connectable with a headrest of a seat of the vehicle

BRIEF DESCRIPTION OF THE DRAWINGS

A further understanding of the disclosed and claimed concept can be gained from the following Description when read in conjunction with the accompanying drawings in which:

FIG. 2 is an elevational view of the partition apparatus of FIG. 1 installed within the interior of the vehicle;

FIG. 3 is another elevational view of the partition apparatus of FIG. 1;

FIG. 3A is a sectional view as taken along line 3A-3A of FIG. 3;

FIG. 5 is an elevational view of the partition apparatus of FIG. 4 installed within the interior of the vehicle;

FIG. 5A is a sectional view as taken along line 5A-5A of FIG. 5;

FIG. 8 is an elevational view of the partition apparatus of FIG. 7 installed within the interior of the vehicle;

FIG. 8A is a sectional view as taken along line 8A-8A of FIG. 8;

Similar numerals refer to similar parts throughout the specification.

DESCRIPTION

Figures 1, 1A:
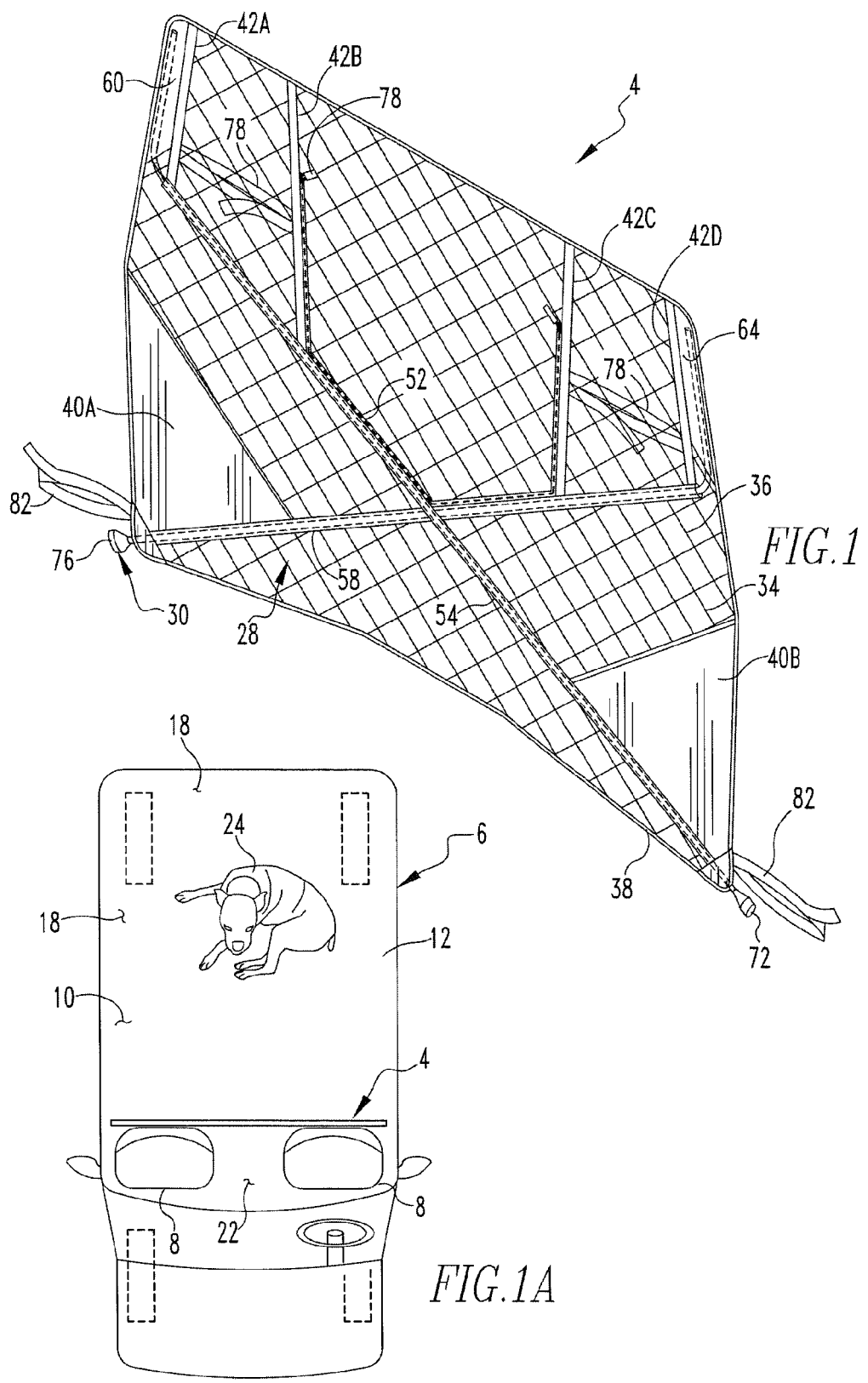
FIG. 1 is a perspective view of an improved partition apparatus in accordance with a first embodiment of the disclosed and claimed concept.
FIG. 1A is a schematic depiction of the partition apparatus of FIG. 1 installed within an interior of a vehicle.

An improved partition apparatus 4 is depicted generally in FIGS. 1-3 and is depicted in part in FIG. 3A. The partition apparatus 4 is advantageously employable in conjunction with a vehicle 6 such as is depicted generally in FIG. 1A. The vehicle 6 has an interior 10 within which are disposed an exemplary set of seats 8. The vehicle further has a pair of headrests 20 which, in the depicted exemplary embodiment, are situated on the seats 8. As can be seen in FIG. 2, the vehicle 6 further includes a floor 12 adjacent the interior 10 and a roof 16A that is likewise adjacent the interior and opposite the floor 12. FIG. 2 additionally depicts an alternative and relatively taller roof 16B that the vehicle 6 may have instead of the roof 16A, it being understood that either or both of roofs 16A and 16B may be referred to herein with the numeral 16. The vehicle 6 further includes a set of braces 14 situated on the floor 12 and upon which the seats 8 are mounted.

As can be understood from FIGS. 1A and 2, the partition apparatus 4 is mountable adjacent the seats 8 within the interior 10 and effectively divides the interior 10 into a first region 18 and a second region 22 that are situated at opposite sides of the partition apparatus 4. The exemplary second region 22 includes the seats 8. The exemplary first region 18 can have an animal 24 situated therein. The partition apparatus 4 advantageously constrains the animal 24 to the first region 18 and resists the animal 24 from moving from the first region 18 into the second region 22. The improved partition apparatus 4 thus resists the animal 24 from interfering with the driver who is operating the vehicle 6, which promotes driving safety.

The partition apparatus 4 can be generally described as including a barrier 28 that is situated on a support apparatus 30. The barrier 28 includes a sheet or layer of material 34 that is flexible and that may be formed of a mesh material having a plurality of holes formed therein or that is otherwise configured to permit a certain amount of light to travel therethrough in order to avoid undesirably obstructing the rearward view of the driver. The exemplary layer of material 34 is depicted herein as including a mesh portion 36 that is surrounded by a perimeter binder 38. The mesh portion 36 may be, by way of example, a nylon mesh or other mesh-like material and has a plurality of holes or voids formed therein. The perimeter binder 38 can be any of a wide variety of fabric or web-like material such as Grosgrain bind or other appropriate material.

The exemplary barrier further includes a pair of fabric portions 40A and 40B that overlie a portion of the layer of material 34 and that form a pocket region between the layer of material 34 and each of the fabric portions 40A and 40B. The fabric portions 40A and 40B can also contribute to the structural stability of the partition apparatus 4 since they are formed of a fabric material that is generally without holes rather than being formed of a mesh material that is formed to include holes. The fabric portions 40A and 40B can be formed of any of a wide variety of materials such as 600 Denier polyester fabric or other such material.

The barrier 28 further includes a number of reinforcements 42A, 42B, 42C, and 42D that are attached to the mesh portion 36, such as through sewing or other attachment methodologies, and further enhance the structural stability of the partition apparatus 4. As employed herein, the expression "a number of" and variations thereof shall refer broadly to any non-zero quantity, including a quantity of one. The reinforcements 42A, 42B, 42C, and 42D can be likewise formed of any of a wide variety of appropriate flexible materials such as fabric materials or web-like materials such as Grosgrain bind, by way of example.

The barrier 28 further has an opening 46 formed therein that is depicted generally in FIG. 3. The barrier 28 additionally includes a door 48 which, in the depicted exemplary embodiment, is a part of the mesh portion 36. The door 48 is movable between a closed configuration generally covering the opening 46, as is depicted generally in FIGS. 1 and 2, and an open configuration wherein at least a portion of the door 48 is spaced from the edges of the opening 46, as is depicted generally in FIG. 3. The barrier 28 further includes a number of fasteners that are operable to retain the door 48 in the closed configuration. The exemplary fastener depicted herein is a zipper 52 that extends between the edges of the door 48 and the edges of the opening 46, although other fasteners such as hook and loop fasteners, snaps, and other appropriate fasteners may be employed without departing from the present concept. The exemplary zipper 52 is attached to the various portions of the barrier 28 via sewing or other attachment methodology.

The door 48 in the closed configuration enables the partition apparatus 4 to constrain the animal 24 to the first region 18. However, the door 48 in the open configuration or in an at least a partially open configuration can permit the animal 24 to move therethrough between the first and second regions 18 and 22. Moreover, the door 48 in an open or at least partially open configuration can permit a person in second region 22 to have access to the first region 18 and/or the animal 24 as needed. Depending upon factors such as the age of the animal 24 and the level of discipline of the animal 24, the partition apparatus 4 can be used with its door 48 in either the open configuration or the closed configuration.

The barrier 28 further includes a pair of elongated receivers 54 and 58 that are attached to the mesh portion 56 and that will be described in greater detail below. The opening 46 and the zipper 52 can be said to extend along the reinforcements 42B and 42C and the receivers 54 and 58. The barrier 28 additionally includes a pair of pockets 60 and 64 that are situated between the perimeter binder 38 and the reinforcements 42A and 42D, respectively. The receivers 54 and 58 are each configured to receive a portion of the support apparatus 30, as will be set forth in greater detail below. The pockets 60 and 64 are likewise each configured to receive a portion of the support apparatus 30 and are formed, in the depicted exemplary embodiment, by additional fabric portions that overlie corresponding portions of the mesh portion 36. The pockets 60 and 64 each have an opening at one end thereof and are configured to receive therein the aforementioned portions of the support apparatus 30 between the mesh portion 36 and the additional fabric portions.

The support apparatus 30 includes a pair of support elements 66 and 70 upon which the barrier 28 is received. The support apparatus 30 further includes a pair of abutments 72 and 76 upon which the support elements 66 and 70 and, in turn, the barrier 28 are carried. The support apparatus 30 additionally includes a set of first straps 78 that are configured to be mounted to the headrests 20 of the seats 8 and a set of second straps 82 that are configured to be attached to the braces 14 which connect the seats 8 with the floor 12. The first and second straps 78 and 84 can be formed of any appropriate elongated and flexible material such as webbing, rope, and the like, and can include snap connectors or other types of connectors depending upon the needs of the application.

As can be understood from FIGS. 1-3, the support element 66 includes an elongated leg 84 and an elongated foot 88. The foot 88 extends from an end of the leg 84 and is oriented generally at an angle that is oblique to the longitudinal extent of the leg 84. As employed herein, the expression "oblique" and variations thereof shall refer generally to a relationship that is neither parallel nor perpendicular. The support element 70 likewise includes a leg 90 and a foot 94 and is substantially identical to the support element 66. The support elements 66 and 70 are formed of a relatively rigid material such as steel tubing or other appropriate material that is relatively more rigid than the barrier 28 and which has a stiffness greater than that of the barrier 28.

As can be understood from FIG. 3A, the receiver 54 is formed from a pair of flexible walls 96A and 96B that are affixed to one another in such a fashion that a receptacle 98 is formed between the walls 96A and 96B. The leg 84 is received in the receptacle 98. The walls 96A and 96B can be formed from any of a wide variety of materials such as fabric materials or web-like materials such as the aforementioned Grosgrain bind, although other materials may be employed without departing from the present concept. The walls 96A and 96B can be understood from FIGS. 1-3 to be elongated and to be attached to one another at the sides in the fashion depicted in FIG. 3A such as through sewing or other attachment methodology. The leg 90 is similarly received in a receptacle formed in the receiver 58, it being understood that the receiver 58 is substantially identical to the receiver 54. In the depicted exemplary embodiments, the receivers 54 and 58 extend across one another and are connected together at a location adjacent the opening 46. The legs 84 and 90 thus likewise extend across one another at the same location adjacent the opening 46, which enhances the structural stability that is provided by the support apparatus 30.

In the depicted exemplary embodiment, the abutments 72 and 76 are disposed on and connected with an end of the legs 84 and 90, respectively, opposite the feet 88 and 94. The abutments 72 and 76 are configured to engage the floor 12 of the vehicle 6 within the interior 8. The abutments 72 and 76 in the depicted exemplary embodiment each include a resilient boot that is in contact with the floor 12 when the partition apparatus 4 is installed in the interior 10 of the vehicle 6.

While the receivers 54 and 58 are themselves flexible, they are nevertheless affixed to the mesh portion 36 and/or other portions of the barrier 28. The legs 84 is received relatively tightly in the receptacle 98 of the receiver 54, and the leg 90 is similarly received in the receptacle of the receiver 58. As such, the support elements 66 and 70 received in the receivers 54 and 58 provide structural support to the otherwise flexible barrier 28. Moreover, the free ends of the feet 88 and 94 may be received against the perimeter binder 38 at the ends of the pockets 60 and 64. The feet 88 and 94 thus provide further structural support to the barrier and thus the partition apparatus 4. When the support elements 66 and 70 are received in the receivers 54 and 58 and in the pockets 60 and 64, the barrier 28 can therefore be said to be situated on the support apparatus 30. The support apparatus 30 can be understood to retain the barrier in an expanded and generally plane-like configuration to serve as a partition between the first and second regions 18 and 22 of the interior 10 of the vehicle 6, which is desirable since the barrier 28 is otherwise relatively flexible and is generally not self-supporting.

When the barrier 28 is received on the support elements 66 and 70, and the abutments 72 and 76 are received on the floor 12, the abutments 72 and 76 support the support elements 66 and 70 and the barrier 28 in the vertical direction and frictionally resist movement of the abutments 72 and 76 and the partition apparatus 4 in the horizontal direction (from the perspective of FIG. 2). The first straps 78 being connected with the seats 8 in the region of the headrests 20 thereof likewise resists movement of the partition apparatus 4 in the horizontal and vertical directions from the perspective of FIG. 2. The abutments 72 and 76 are engaged with the floor 12 and, in so doing, provide vertical support to the partition apparatus 4 and resist horizontal movement of the partition apparatus 4, from the perspective of FIG. 2. As such, attachment of the second straps 82 to the braces 14 that mount the seats 8 to the floor 12 is optional. The second straps 82 can be mounted to the braces 14 if the level of discipline of the animal 24 requires such extra attachment of the partition apparatus 4 to the seats 8 for added security in constraining the animal to the first region 18.

Advantageously, therefore, the platform apparatus 4 is generally lightweight since it is formed of fabric-type materials and mild hollow steel tubing, along with some other materials. Moreover, the partition apparatus 4 is relatively inexpensive to manufacture and sell since its constituent materials are relatively inexpensive and because its method of assembly does not involve costly or complex assembly processes and rather can typically be formed primarily by sewing or other simple attachment methodology. The light weight of the partition apparatus 4 and the flexibility of the barrier 28 make the partition apparatus 4 easy to assemble and to install into and remove from the vehicle 6. Even though the support elements 66 and 70 are themselves relatively rigid, the support elements 66 and 70 situated in the receivers 54 and 58 still do not render the partition apparatus 4 completely rigid since the receivers 54 and 58 are themselves mounted to the mesh portion 36 which is itself highly flexible. The support element 66 and 70 are additionally at least somewhat flexible since in the depicted exemplary embodiment they are manufactured of mild steel. Since the mesh portion 36 extends across generally the entirely of the partition apparatus 4, and since the mesh partition 36 permits light to be communicated through its holes or openings, the partition apparatus 4 installed in the interior 10 of the vehicle 6 provides at most only minimal to moderate obstruction of the driver's rearward view, which promotes safety. If desired, certain portions of the partition apparatus 4 can be formed of materials having an even lesser degree of vision obstruction, such as by employing translucent materials or materials wherein the mesh content is very small in comparison with the open content thereof.

Further advantageously, the partition apparatus 4 installed in the vehicle 6 is relatively quiet and even silent during operation of the vehicle 6. That is, whereas other devices which are formed of more rigid materials may rattle as the vehicle 6 is operated along a roadway, the partition apparatus 4 generally has no rigid components that directly engage one another. While the legs 84 and 90 extend across one another, they do not physically contact one another and rather are retained in the receivers 54 and 58. The legs 84 and 90 have fixed connections with the abutments 72 and 76 and thus their connections do not rattle or otherwise cause noise. The resilient boots of the abutments 72 and 76 engaged with the floor 12 likewise do not vibrate or otherwise produce meaningful noise during operation of the vehicle 6. Moreover, the generally fabric-like configuration of the partition apparatus 4 and its overall flexibility are soft features that promote relaxation and comfort within the interior 10 of the vehicle 6, which is desirable. Other advantages will be apparent to one of ordinary skill in the art.

An improved partition 104 in accordance with a second embodiment of the disclosed and claimed concept is depicted generally in FIGS. 4-6D. The partition apparatus 104 bears some similarity to the partition apparatus 4 and is likewise installable within the interior 10 of the vehicle 6. In addition to being engageable with the floor 12 of the vehicle 6, the partition apparatus 104 is additionally engageable with the roof 16. The partition apparatus 104 can be said to include a barrier 128 that is situated on the support apparatus 130, with the barrier 128 being of a generally flexible configuration, and with the support apparatus 130 retaining the barrier 128 in an expanded and generally plane-like configuration.

The barrier 128 includes a layer of material 134 that is flexible and that includes a flexible mesh portion 136. The barrier 128 further includes a pair of fabric portions 140A and 140B that each at least partially overlie the mesh portion 136 and that are connected therewith via sewing or other appropriate attachment methodology. The fabric portions 140A and 140B can form pocket-like receptacles between one another and/or between either of them and the mesh portion 136.

The mesh portion 136 has an opening 146 formed therein and a door 148 that is changeable between an open configuration and a closed configuration and is retainable in the closed configuration by a zipper 152. The barrier 128 further includes a receiver 154 that is attached to the mesh portion 136 via sewing, etc.

The support apparatus 130 includes a pair of support elements 166 and 170 that are each generally rigid and that are, at the least, relatively more rigid than the barrier 128. As can be understood from FIGS. 4 and 4A, the support elements 166 and 170 are situated in pair of receivers 158A and 158B that are formed of flexible fabric or mesh material and that are attached via sewing or other attachment methodology to the mesh portion 136. The receivers 158A and 158B are substantially similar to one another. In the depicted exemplary embodiment, the support elements 166 and 170 are formed largely of steel tubing, but other materials can be employed without departing from the present concept.

Figures 6A, 6B, 6C, 6D:
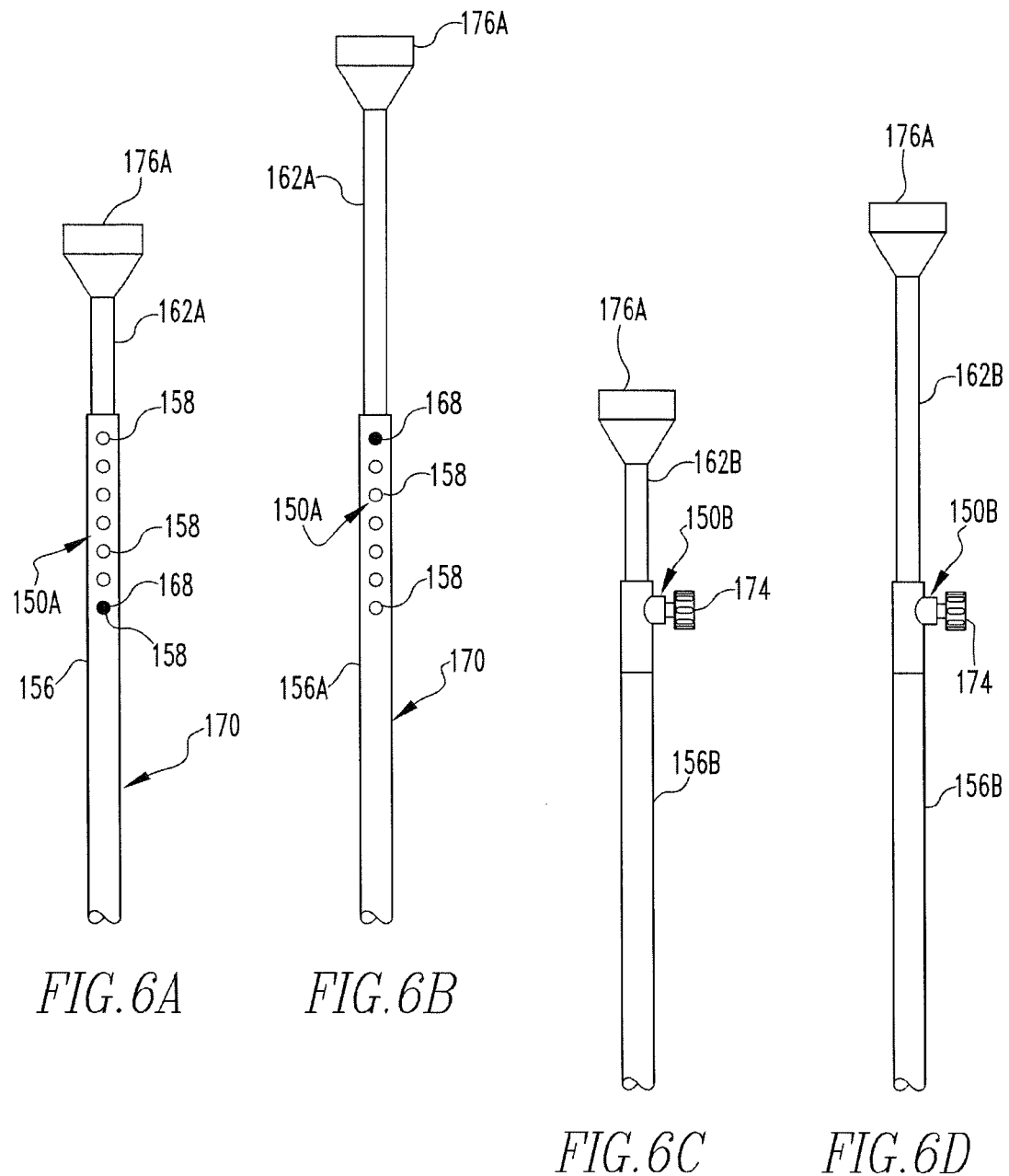
FIG. 6A is an enlarged view of the indicated portion of FIG. 5.
FIG. 6B is a view similar to FIG. 6A, except depicting a length adjustment mechanism adjusted to a different length than that depicted in FIG. 6.
FIG. 6C is a view similar to FIG. 6A, except depicting an alternative length adjustment mechanism in accordance with the disclosed and claimed concept.
FIG. 6D is a view similar to FIG. 6C, except depicting the alternative length adjustment mechanism adjusted to a different length than that depicted in FIG. 6C.

The support elements 166 and 170 each include a length adjustment mechanism 150A such as is depicted generally in FIGS. 6A and 6B. The length adjustment mechanism 150A is operable to adjust the length of each of the support elements 166 and 170 in order to enable each of the support elements 166 and 170 to engage the roof 16 in addition to engaging the floor 12.

In the depicted exemplary embodiment, the length adjustment mechanism 150A includes a spanning portion 156A to which the barrier 128 is mounted and which has formed therein a plurality of aligned detent holes 158. The spanning portion 156A is cooperable with a pole 162A having a spring-loaded ball 168 situated thereon. The pole 162A with the ball 168 is receivable in the elongated hole formed in the hollow tube from which the spanning portion 156A is formed and can be telescoped therein. The ball 168 is receivable in any of the detent holes 158 to retain the support element 166 and the support element 170 in any of a variety of overall lengths.

The pole 162A of the support element 166 has an abutment 172A affixed thereto, as is indicated in FIGS. 6A and 6B, and the pole 162A of the support element 170 likewise has an abutment 176A situated at an end thereof. The abutments 172A and 176A each include a resilient boot that is engageable with the roof 16. It can be seen that the support elements 166 and 170 each have an abutment 172B and 176B, respectively, affixed to the ends thereof opposite the pole 162A. By adjusting the length adjustment mechanism 150A of each of the support elements 166 and 170, the support elements 166 and 170 can be sized to apply a nominal compressive force to the floor 12 and to the roof 16, which helps to frictionally retain the support apparatus 130 in a position installed within the interior 10 of the vehicle 106.

An alternative length adjustment mechanism 150B is depicted generally in FIGS. 6C and 6D. The length adjustment mechanism 150B includes a spanning portion 156B that cooperates telescopically with a pole 162B, and the spanning portion 162B includes a threaded locking mechanism 174 that is operable to lock the pole 162B in an infinite variety of positions with respect to the spanning portion 156B. The threaded locking mechanism 174 is threadable to apply compressive forces to the pole 162B and to the spanning portion 156B, whereby friction due to the compressive forces retains the pole 162B in a given position with respect to the spanning portion 156B.

Figures 4, 4A:
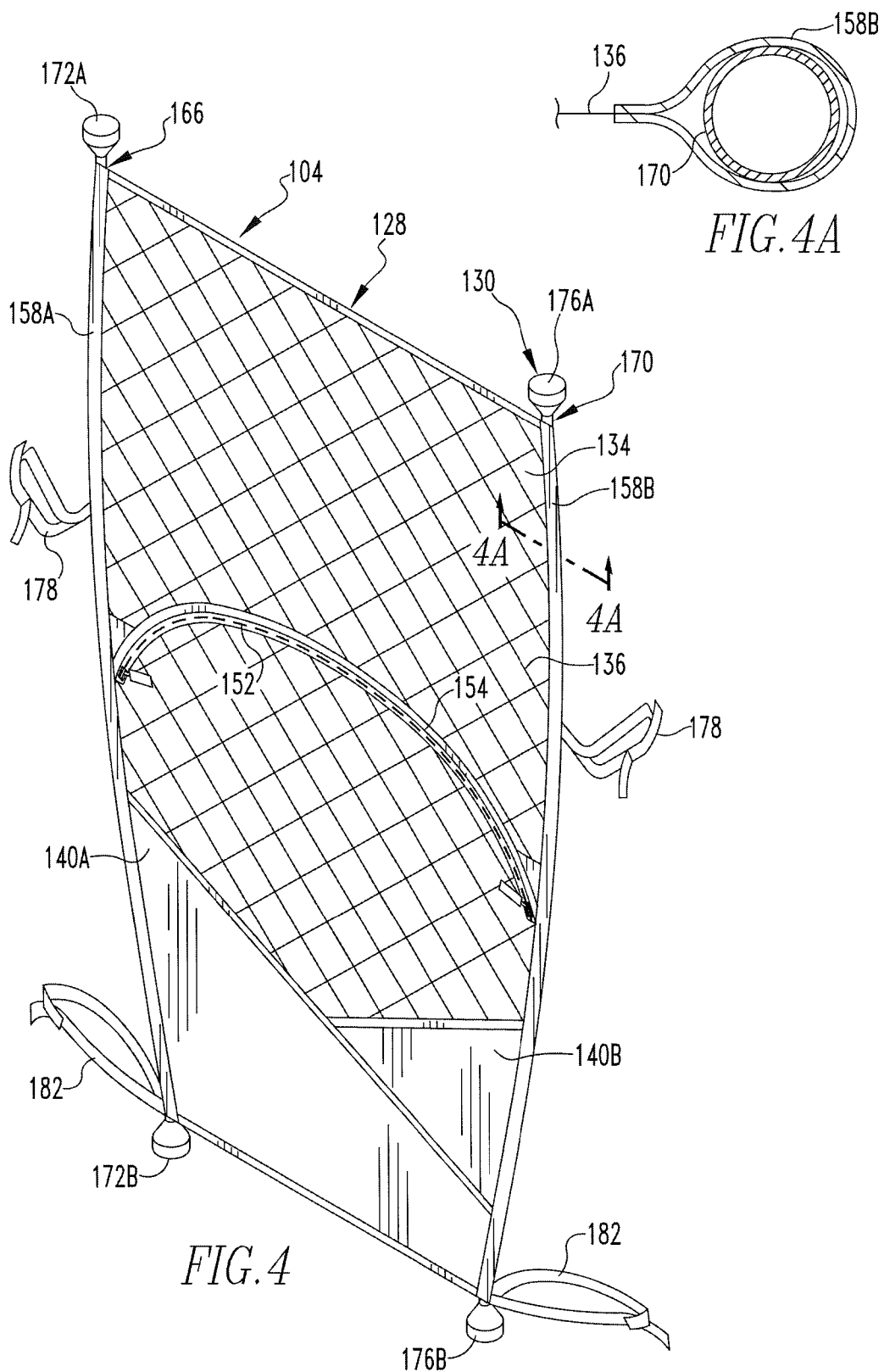
FIG. 4 is a perspective view of an improved partition apparatus in accordance with a second embodiment of the disclosed and claimed concept.
FIG. 4A is a sectional view as taken along line 4A-4A of FIG. 4.

The support apparatus 130 further advantageously includes a flexible strut 180 that extends generally between the support elements 166 and 170. The strut 180 is situated in the receiver 154 which, as can be understood from FIGS. 4 and 5, is of a generally arcuate shape extending between the support elements 166 and 170. The receiver 154 is more particularly depicted in FIG. 5A as including a pair of walls 196A and 196B that are connected together and which have a receptacle 198 disposed therebetween.

When the strut 180 is received in the receptacle 198 of the receiver 154, the strut 180 is loaded in bending, i.e., is elastically strained in bending, and thus applies forces to the support elements 166 and 170. Such forces include compressive force components 186A and 186B that are directed generally away from one another. The forces 186A and 186B applied to the support elements 166 and 170 help to cause the support elements 166 and 170 to retain the barrier 128 in the expanded and generally plane-like configuration depicted generally in FIGS. 4 and 5. The strut 180 in the depicted exemplary embodiment is formed of a rod of spring steel but could be formed of any of a wide variety of materials that are suited to the loading that is imparted by its reception in the receiver 154.

The support apparatus 130 further comprises a set of first straps 178 that are connectable with the headrests 20 and a set of second straps 182 that are connectable with the braces 14 that connect the seats 8 with the floor 12. However, since the support apparatus 130 is engageable with both the floor 12 and the roof 16 via adjustment of the length mechanism 150A, it can be seen that the support elements 166 and 170 are capable of frictionally retaining the partition apparatus 104 in its installed position without the need to employ the first and second straps 178 and 182. It thus can be seen that use of the first straps 178 and 182 is optional, it being further noted that in other embodiments the partition apparatus 104 may be provided without the first straps or the second straps or both. The first and second straps 178 and 182 can be installed on the headrests 20 and the braces 14 respectively, if additional connection reliability and security are desired.

An improved partition apparatus 204 in accordance with a third embodiment of the disclosed and claimed concept is depicted generally in FIGS. 7-9B. The partition apparatus 204 includes a barrier 228 and a support apparatus 230 and is movable between an expanded configuration such as is depicted generally in FIGS. 7 and 8 and a collapsed configuration such as is depicted generally in FIG. 9B. The partition apparatus 204 is mountable to the seats 8 within the interior 10 of the vehicle 6.

The barrier 228 includes a layer of material 234 that is flexible and that includes a mesh portion 236. The barrier 228 further includes a pair of fabric portions 240A and 240B, each of which at least partially overlies the mesh portion 236 and which is configured to form pocket-like structures therewith. The barrier 228 further includes a perimeter binder 238 that also operates as a receiver 254. As can be seen in FIG. 8A, the receiver 254 is formed of a wall 296 of flexible material such as webbing that is connected to itself in such a fashion to form an elongated receptacle 298 that extends about the perimeter of the barrier 228.

The support apparatus 230 includes a support element 266 that is situated in the receiver 254 and which extends about the perimeter of the barrier 228. The support element 266 is, more specifically, received in the receptacle 298. In the depicted exemplary embodiment, the support element 226 is a thin bar of spring steel, but other materials may be employed without departing from the present concept.

The support apparatus 230 further includes a set of first straps 278 and a set of second straps 282, all of which are affixed to the perimeter binder 238, such as by sewing or other appropriate methodology. The first and second straps 278 and 282 are attachable to the headrests 20 and the braces 14, respectively, thereby attaching the partition apparatus 204 to the seats 8.

Figure 7:
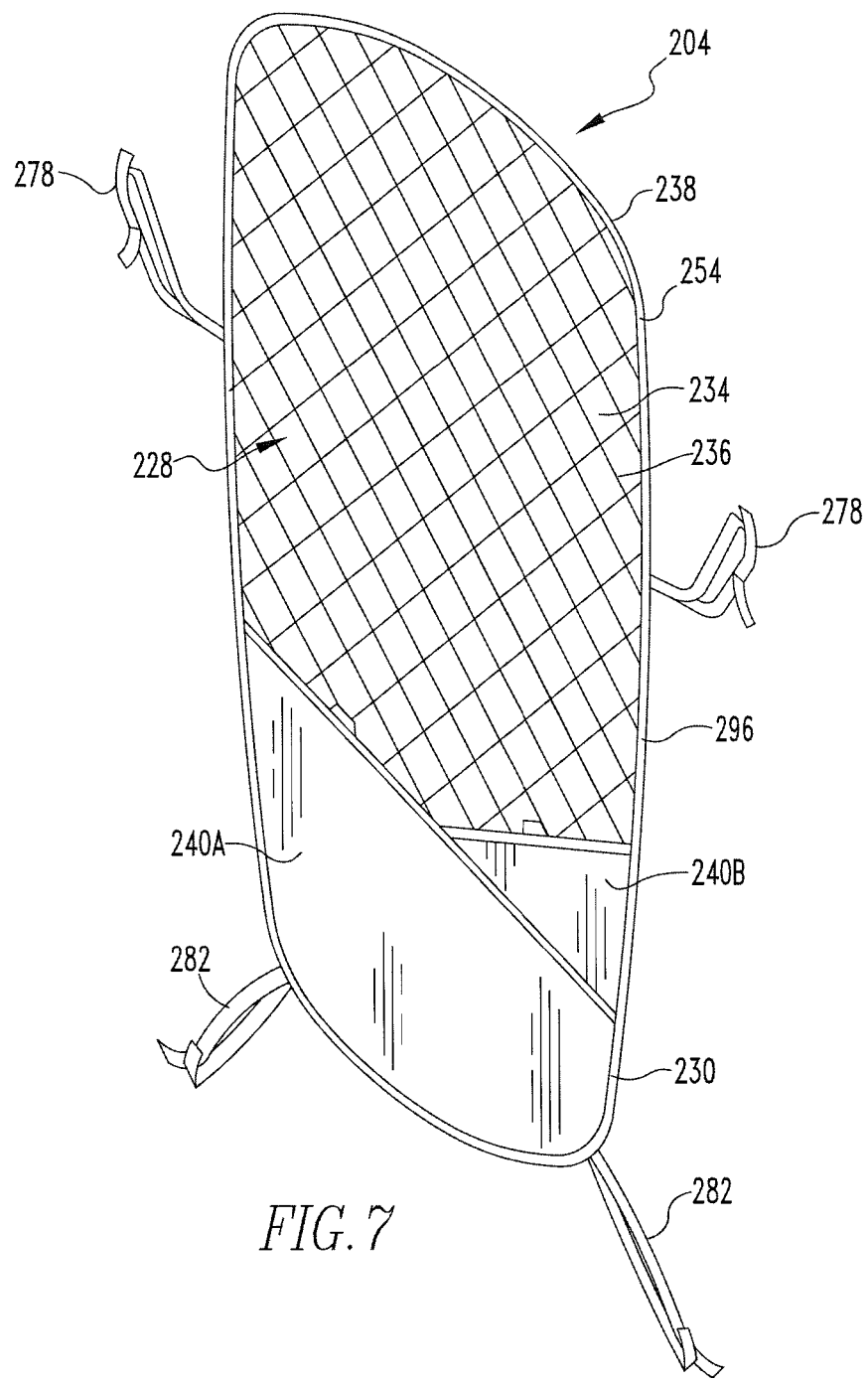
FIG. 7 is a perspective view of an improved partition apparatus in accordance with a third embodiment of the disclosed and claimed concept.
Figure 9A:
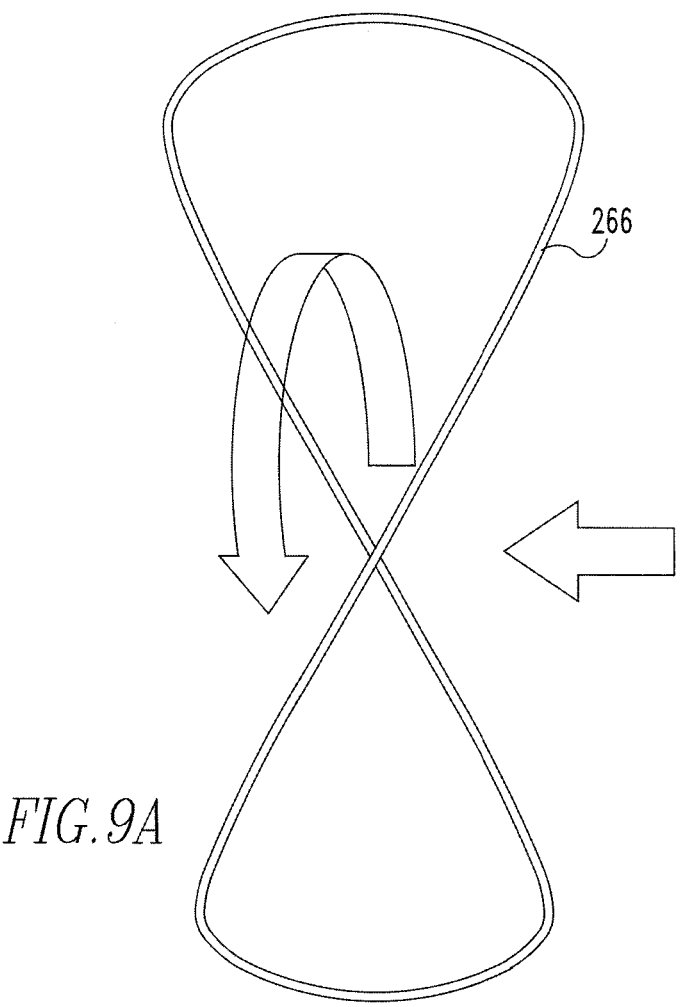
FIG. 9A is a schematic depiction of the way in which the partition apparatus of FIG. 8 can be folded to change it from an expanded configuration as depicted in FIGS. 7 and 8 to a collapsed configuration.

It can be seen that the support element 266 situated in the receiver 254 can retain the barrier 228 in the expanded configuration that is depicted generally in FIGS. 7 and 8 wherein the barrier 228 is retained in an expanded and generally plane-like configuration, which enables the partition apparatus 204 to be attached to the seats 8. As can be understood from FIGS. 9A and 9B, however, the partition apparatus 204 is foldable from its expanded configuration of FIGS. 7 and 8 into a collapsed configuration that is depicted generally in FIG. 9B. The partition apparatus 204 is generally represented in FIG. 9A by the support element 266 for clarity of explanation. In the collapsed configuration of FIG. 9B, the partition apparatus 204 occupies relatively less space, which is convenient for storage when the partition apparatus 204 is not in use.

Figure 10:
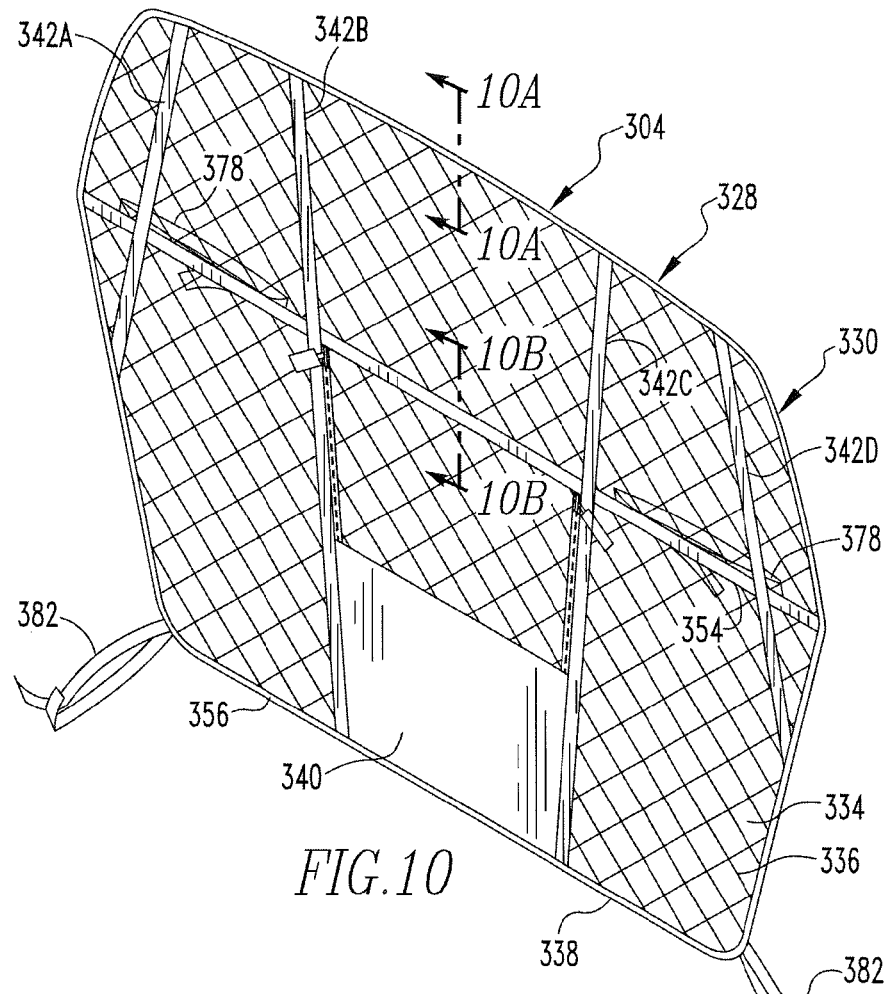
FIG. 10 is a perspective view of an improved partition apparatus in accordance with a fourth embodiment of the disclosed and claimed concept.
Figure 10A:
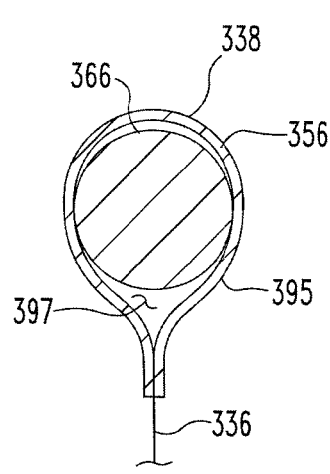
FIG. 10A is a sectional view as taken along line 10A-10A of FIG. 10.
Figure 10B:
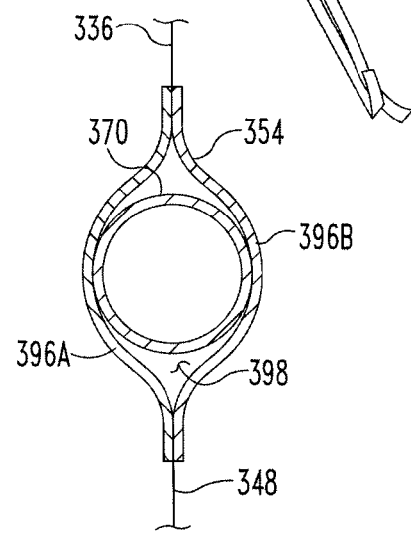
FIG. 10B is a sectional view as taken along line 10B-10B of FIG. 10.
Figure 11:
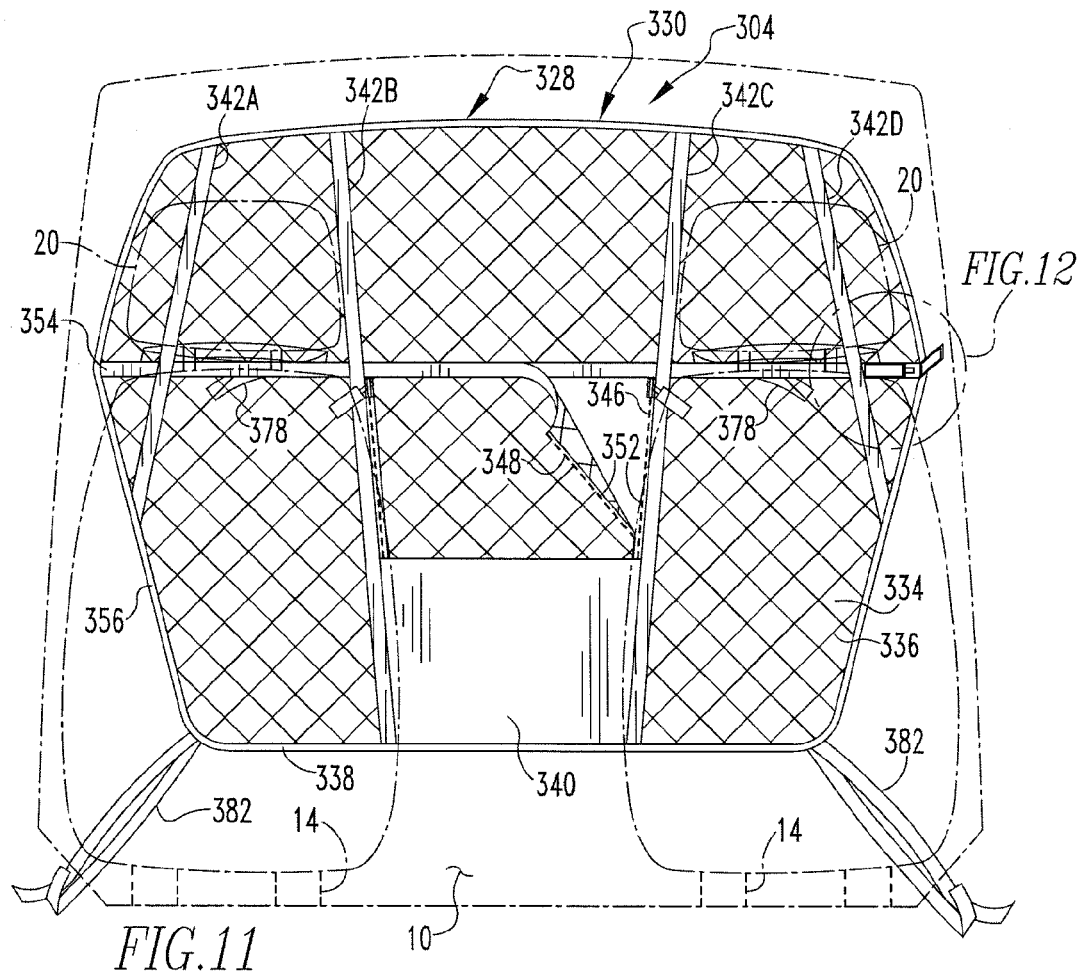
FIG. 11 is an elevational view of the partition apparatus of FIG. 10 installed within the interior of the vehicle.
Figure 12:
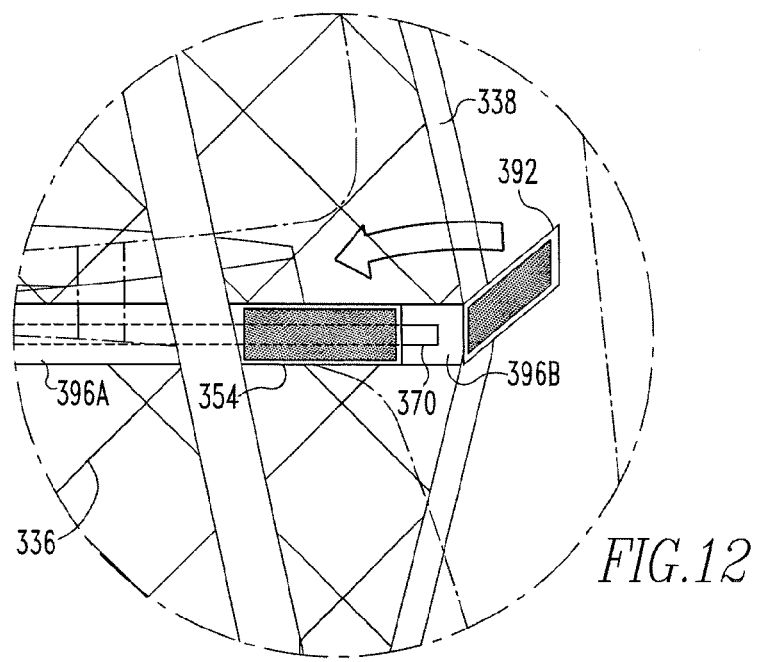
FIG. 12 is an enlarged view of the indicated portion of FIG. 11.

An improved partition apparatus 304 in accordance with a fourth embodiment of the disclosed and claimed concept is depicted generally in FIGS. 10-11 and is depicted in part in FIGS. 10A, 10B, and 12. The partition apparatus 304 includes a barrier 328 and a support 330. The barrier 328 is generally flexible, and the support apparatus 330 is relatively rigid or is at least relatively more rigid than the barrier 328. The barrier 328 is disposed on the support apparatus 330.

The barrier 328 includes a layer of material 334 that is flexible and that includes a mesh portion 336. The barrier 328 in the depicted exemplary embodiment additionally includes a fabric portion 340 that overlies a portion of the mesh portion 336 and which forms a pocket between the fabric portion 340 and the mesh portion 336. The barrier 328 further includes a plurality of reinforcements 342A, 342B, 342C, and 342D, each of which extend between two different locations along the perimeter of the barrier 328 and which help to reinforce the barrier 328. In the depicted exemplary embodiment, the reinforcements 342A, 342B, 342C, and 342D are formed of a flexible yet strong material such as a fabric material or mesh material, by way of example.

The mesh portion 336 has an opening 346 formed therein. A portion of the mesh portion 336 is configured as a door 348 that is movable between a closed configuration, such as is depicted generally in FIG. 10, and an open configuration, such as is depicted generally in FIG. 11. The barrier 328 includes a fastener in the form of an exemplary zipper 352 that is extendable between the edges of the opening 348 and the edges of the door 348. The door in the open configuration can be received in the pocket formed between the fabric portion 340 and the mesh portion 336.

The barrier 328 additionally includes a perimeter binder 338 that extends about the perimeter of the barrier 328 and that serves as a receiver 358. As can be understood from FIG. 10A, the perimeter binder 338 is formed of a wall 395 of fabric or webbing material that is turned back on itself and is sewn together to form a receptacle 397 within which the support element 366 is received.

The barrier 328 further includes a receiver 354 that is mounted to the mesh portion 336 and that extends generally transverse across the barrier 328 between two opposite locations on the perimeter binder 338. The receiver 354 is formed from a pair of walls 396A and 396B that are formed from a flexible fabric or webbing material and that are connected together to form a receptacle 398 within which the support element 370 can be received. The receiver 354 further includes a flap 392 which can be closed with a fastener such as a hook and loop structure and which can be employed to close the receptacle 398, such as is depicted generally in FIG. 12.

The support apparatus 330 includes a support element 366 that is receivable in the receptacle 397 of the perimeter binder and further includes another support element 370 that is received in the receptacle 398 of the receiver 354. The support element 366 is, in the depicted exemplary embodiment, a thin bar of spring steel. The support element 370 that is depicted in the exemplary embodiment presented herein is in the form of a multi-part collapsible fiberglass based rod, although the support element 370 can be of other configurations without departing from the present concept. The support elements 366 and 370 together retain the barrier 328 in an expanded configuration that is generally plane-like.

The support apparatus 330 additionally includes a set of first straps 378 that are connectable with the headrests 20 of the seats 8. The support apparatus 330 further includes a set of second straps 382 that are attachable to the braces 14 that are situated between the seats 8 and the floor 12.

Figure 9B:
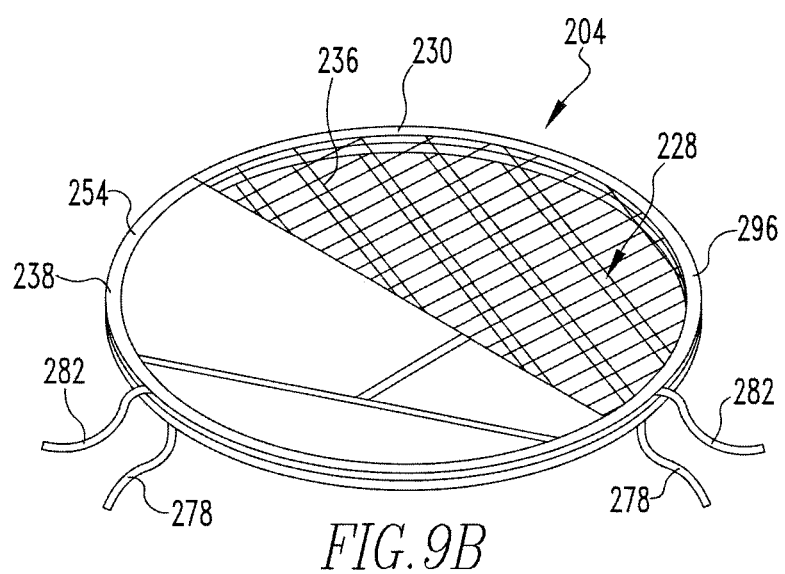
FIG. 9B is a perspective view of the partition apparatus of FIG. 7 in the collapsed configuration.

The partition apparatus 304 is movable between the expanded configuration depicted generally in FIGS. 10 and 11 and a collapsed configuration that is not expressly depicted herein but that is similar to the collapsed configuration of the partition apparatus 204 that is depicted generally in FIG. 9B. In order to move the partition apparatus 304 from the expanded configuration of FIGS. 10 and 11 to the collapsed configuration, the flap 392 is opened, and the support element 370 is removed from the receiver 354. The partition apparatus 304 minus the support element 370, which can generally be described as being the barrier 328 and the support element 366, can then be folded as is depicted generally in FIG. 9 in connection with the partition apparatus 204. If the support element 370 is of a multi-part configuration or is otherwise collapsible, it can be stored together with the collapsed portions of the partition apparatus 304. In order to move the partition apparatus from the collapsed configuration to the expanded configuration of FIGS. 10 and 11, the collapsed barrier 328 and support element 366 are expanded, such as by moving them in the opposite direction from what is depicted generally in FIG. 9A in relation to the partition apparatus 204. The support element 370 is then assembled or expanded if the partition element 370 is formed of multiple parts. The elongated support element 370 is then received in the receptacle 398, and the flap 392 is closed by securing it to another portion of the receiver 354 through the use of a fastener such as a hook and loop fastener or another fastener.

As can be understood therefore, the various partition apparatuses 4, 104, 204, and 304 are each of a lightweight, inexpensive, and at least somewhat flexible nature and thus are easy to install in the interior 10 of the vehicle 6 and to remove therefrom. Further advantages will be apparent to one of ordinary skill in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A partition apparatus structured to divide an interior of a vehicle into a first region and a second region to resist an animal from moving between the first region and the second region, the partition apparatus comprising:
  a barrier formed of a layer of flexible material and having a door formed in the flexible material, the door being movable between a closed position and an open position to enable passage between the first and second regions;
  a support apparatus formed at least in part of a material having a stiffness greater than that of the barrier and having at least a first buttress structured to engage a floor of the vehicle, the barrier being disposed on the support apparatus, the support apparatus being structured to retain at least a portion of the barrier in an expanded and generally planar configuration.

2. The partition apparatus of claim 1, wherein the support apparatus further comprises a second buttress that is structured to engage a roof of the vehicle.

3. The partition apparatus of claim 1, wherein the door is attached to the barrier by a first fastener.

4. The partition apparatus of claim 1, wherein the support apparatus further comprises at least a first support element that is elongated and extending generally away from the first buttress, at least a portion of the barrier being disposed on the first support element.

5. The partition apparatus of claim 4, wherein the first support element is connected to the first buttress.

6. The partition apparatus of claim 1, wherein the support apparatus further comprises a first support element that is elongated and that extends generally between the first buttress and a second buttress, at least a portion of the barrier being disposed on the first support element.

7. The partition apparatus of claim 6, wherein the support apparatus further comprises a third buttress, a fourth buttress, and a second support element, the second support element being elongated and extending generally between the third and fourth buttresses, at least a portion of the barrier being disposed on the second support element, the barrier extending generally between the first support element and the second support element.

8. The partition apparatus of claim 7, wherein the first support element and the second support element each comprise a length adjustment mechanism, the length adjustment mechanisms being operable to adjust the respective lengths of the first support element and the second support element.

9. The partition apparatus of claim 1, wherein the support apparatus further comprises another buttress that is structured to engage the floor of the vehicle and a pair of support elements that are each elongated, a first support element of the pair of support elements extending generally away from the first buttress, and a second support element of the pair of support elements extending generally away from the another buttress.

10. The partition apparatus of claim 9, wherein the support element and the second support element extend across one another.

11. The partition apparatus of claim 9, wherein the support element and the second support element each include an elongated leg and an elongated foot, each said foot extending from the corresponding leg at an angle oblique to a longitudinal dimension of the corresponding leg.

12. The partition apparatus of claim 11, wherein the support apparatus further comprises a pair of connection straps that are structured to be connectable with a pair of headrests of a seat of the vehicle.

13. The partition apparatus of claim 9, wherein the support apparatus further comprises a flexible strut that extends between the first support element and the second support element.

14. The partition apparatus of claim 13, wherein the barrier is connected with the first support element and the second support element, the flexible strut being in a loaded state upon bending to apply compressive force components to the first support element and the second support element, the compressive force components being oriented in directions generally away from one another.

15. A partition apparatus structured to divide an interior of a vehicle into a first region and a second region to resist an animal from moving between the first region and the second region, the partition apparatus comprising:
  a barrier formed of a layer of flexible material;
  a support apparatus formed at least in part of a material having a stiffness greater than that of the barrier, the barrier being disposed on the support apparatus, the support apparatus being structured to retain at least a portion of the barrier in an expanded and generally planar configuration, the support apparatus comprising at least a first buttress structured to engage a floor of the vehicle, the support apparatus further comprising another buttress that is structured to engage the floor of the vehicle and a pair of support elements that are each elongated, a first support element of the pair of support elements extending generally away from the first buttress, a second support element of the pair of support elements extending generally away from the another buttress, the at least first buttress and the another buttress each comprise a resilient boot that is structured to engage the floor of the vehicle.

16. A partition apparatus structured to divide an interior of a vehicle into a first region and a second region to resist an animal from moving between the first region and the second region, the partition apparatus comprising:

a barrier formed of a layer of flexible material, the barrier having a mesh portion and a fabric portion;

a support apparatus comprising a first support element and a second support element, the first and second support elements being elongated and formed at least in part of a material having a stiffness greater than that of the barrier, the first and second support elements extending along the barrier to separate the mesh portion and the fabric portion;

the barrier being disposed on the support apparatus, the first support element extending about a perimeter of the barrier and being structured to retain at least a portion of the barrier in an expanded and generally planar configuration; and a first connection strap that is structured to be connectable with a headrest of a seat of the vehicle.

17. The partition apparatus of claim 16, wherein the fabric portion includes a first fabric portion and a second fabric portion having a pocket formed therebetween, at least a portion of the second support element being situated in the pocket.

18. The partition apparatus of claim 16, wherein the barrier further comprises a door formed in the flexible material, the door being movable between a closed position and a second position to allow passage between the first and second regions.

19. The partition apparatus of claim 16, wherein the barrier comprises a pocket formed between the fabric portion and the mesh portion, at least a portion of the second support element being situated in the pocket.

\* \* \* \* \*